(No Model.) 2 Sheets—Sheet 2.
J. VAN.
FIRE GRATE.
No. 265,189. Patented Sept. 26, 1882.
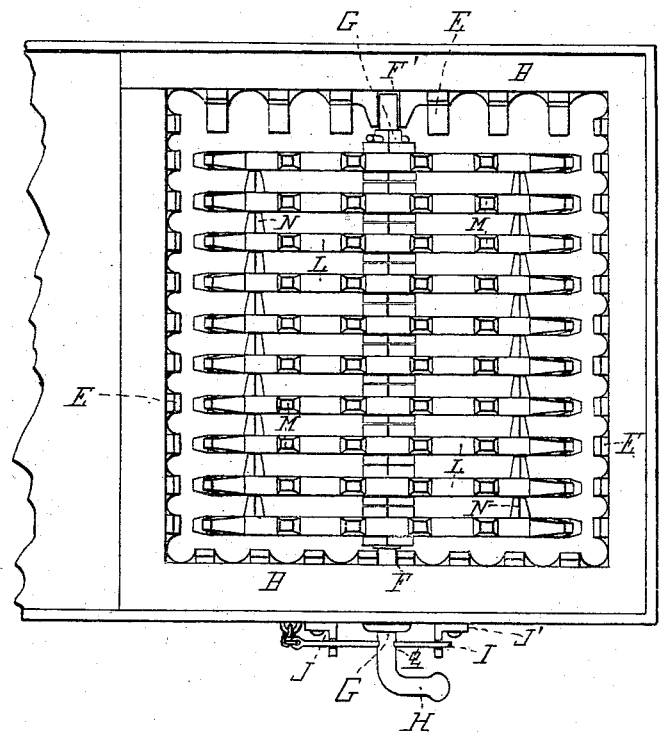
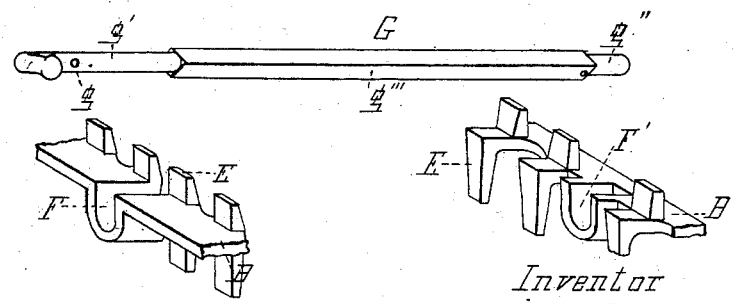
Attest
Carl Spengel
Wm S. Sayers
Inventor
John Van
by Knight Bros
Atty's

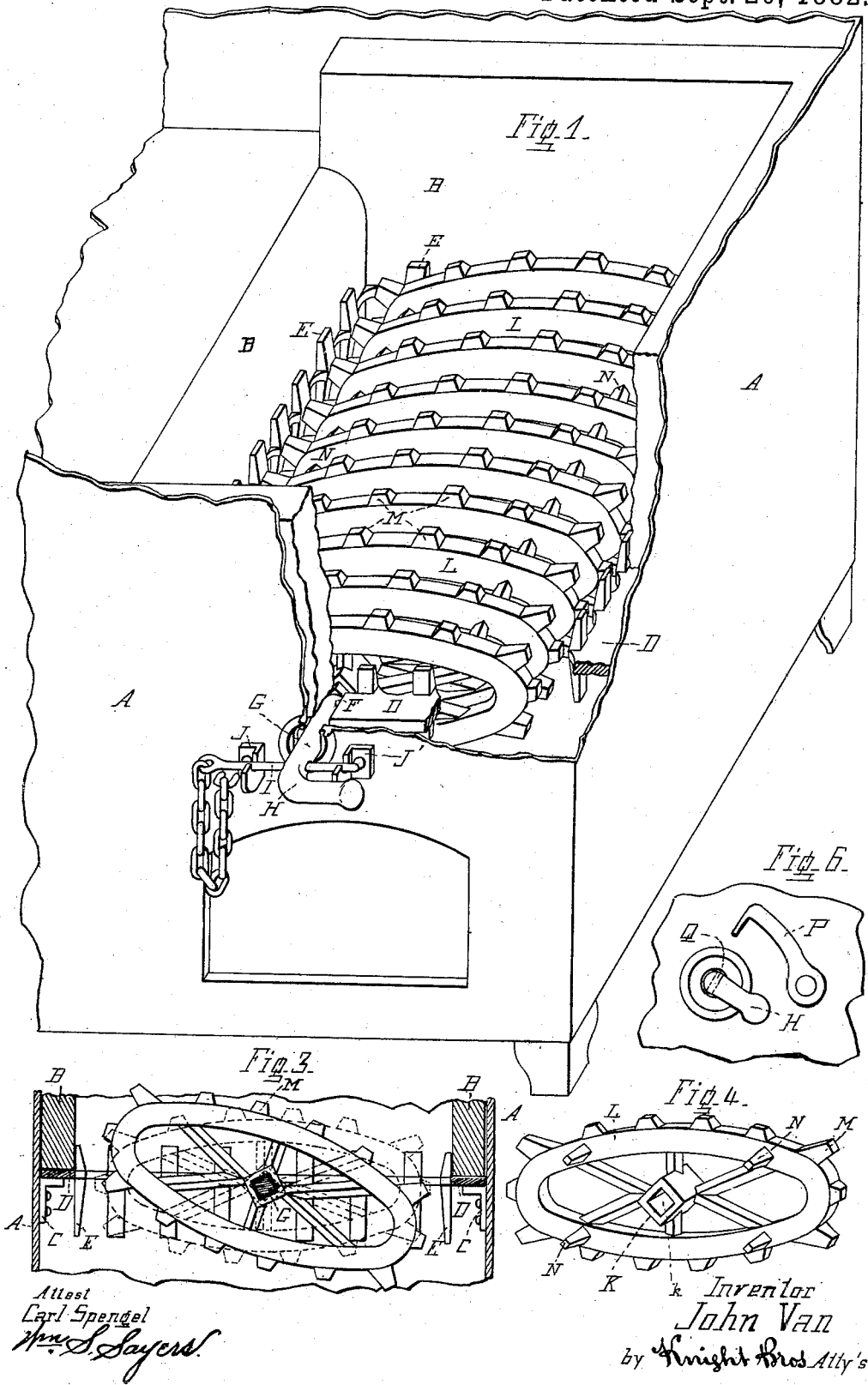

UNITED STATES PATENT OFFICE.

JOHN VAN, OF CINCINNATI, OHIO.

FIRE-GRATE.

SPECIFICATION forming part of Letters Patent No. 265,189, dated September 26, 1882.

Application filed July 19, 1882. (No model.)

*To all whom it may concern:*

Be it known that I, JOHN VAN, of Cincinnati, Hamilton county, Ohio, have invented a new and useful Improvement in Fire-Grates, of which the following is a specification.

My invention has for its object a form of fire-grate for cooking-range and other fire-places that combines durability with great freedom of draft and facility for dumping the contents and reversal of the grate-bottom.

My improvement relates particularly to the grate floor or bottom, which consists essentially of an open double grating or cresset, preferably of a flattened cylindrical form, which is made up of a system of open elliptical frames formed with lateral studs and projecting hubs having angular orifices, and transfixed upon a horizontal shaft having angular body, by which they are suspended in the fire-chamber, and by which they are held in position for use, or agitated, dumped, or inverted, as the exigencies of use may require.

In the accompanying drawings, Figure 1 is a perspective, and Fig. 2 a top view, showing my grate in place within a range, portions of whose fire-wall and grate-rest are broken away to expose the operative parts. Fig. 3 is a vertical section of the same at right angles to the shaft. Figs. 4 and 5 are respectively detached views of one of the component panels or sections, and of the shaft, with its supporting-bearings. Fig. 6 shows a modification of my shaft-lock.

A may represent a portion of the outer shell or body of a cooking-range, and B the walls of the fire-chamber. Brackets C upon said shell support an open rectangular frame, D, that constitutes my grate-rest. This rest may be plain, but is preferably armed with teeth E, which, while contracting to some extent the interstice between the chamber-walls and the grate, and thus preventing the escape of fuel, permit the descent of ashes and the ascent of draft-air. Depressions F F' in the front and rear bars of the grate-rest receive and support a shaft, G, whose forward extremity is bent rectangularly to form a handle, H. The portion of the shaft which protrudes beyond the fire-front has an orifice, $g$, which receives a pin, I, that, resting in lugs J J', that project from the range-body, serves to steady the shaft, while permitting a limited rocking of the same, such as will suffice to stir the fire and precipitate ashes. The portions $g'$ $g''$ of the shaft which occupy the depressions F F' are cylindrical, and constitute its journals. The portion $g'''$ of the shaft situated between the journals is of square or other non-circular section, and occupies corresponding orifices, $k$, Fig. 4, in the hubs K of a congeries of grate-bars or sections L, having preferably the form of open-work elliptical disks, whose peripheries are preferably armed with radial spurs M. The hubs K project sufficiently beyond the faces of the elliptical disks to hold them a sufficient distance asunder to afford openings for the descent of ashes and the ascent of draft-air. Studs N, that project from one side of each section, may also aid in holding them the proper distance apart. The grate-rest is preferably constructed of sufficient width to support lining-slabs B, of fire-tile or other refractory material.

A modification of my shaft-lock is shown at Fig. 6, in which a hook, P, which enters a slot, Q, in the shaft G, exercise the same functions as are discharged by the pin I.

All parts of the open elliptical sections are so made as to combine strength with lightness and ample passage-way for descending ashes and ascending draft-air.

The studded and arching or comb form and separation from one another, with consequent free access of draft-air of the for the time being upper side of the described sectional grate, protects both it and the supporting-shaft against sagging by heat, the said grate, by holding the incandescent mass well away from the supporting-shaft, preventing its succumbing to the intense heat of the fire.

A still further security against sagging and burning out is afforded by the capacity to completely invert the grate at any moment, so as to expose the diametrically-opposite sides of both sectional grate and supporting-shaft to the influence of the fire, any tendency to sag that may have been acquired by the supporting-shaft being, of course, by such change in position reversed.

Should any one or more of the sections become damaged by heat, they can be readily and cheaply replaced by new ones without necessitating renewal of the entire grate.

All the sections of any given size of grate are easily molded and cast from a single pattern of my simple construction.

The above-described preferred form of my invention may be varied in non-essential particulars. For example, a circular, an oblong, or an approximately rectangular form may be given to the component grate-sections to suit different purposes of combustion, &c.

I claim as new and of my invention—

The improved reversible grate, consisting of shaft G, having non-circular portion $g'''$, and a series of open disks, L, each formed with lateral studs N, and projecting hub K, having non-circular orifice $k$, as set forth.

In testimony of which invention I hereunto set my hand.

JOHN VAN.

Attest:
GEO. H. KNIGHT,
N. ROCKHOLD, Jr.